United States Patent [19]

Harrison

[11] Patent Number: 4,781,365
[45] Date of Patent: Nov. 1, 1988

[54] HOLLOW ELASTOMERIC SPRING

[75] Inventor: Reginald Harrison, Oadby Leicestershire, England

[73] Assignee: Dunlop Limited, United Kingdom

[21] Appl. No.: 9,531

[22] Filed: Feb. 2, 1987

Related U.S. Application Data

[63] Continuation-in-part of Ser. No. 713,709, Mar. 19, 1985, abandoned.

[30] Foreign Application Priority Data

Mar. 29, 1984 [GB] United Kingdom ............... 8408167
Jan. 5, 1985 [GB] United Kingdom ............... 8500274

[51] Int. Cl.$^4$ .................... B60G 11/22; F16F 1/40
[52] U.S. Cl. ................... 267/294; 248/634; 267/141.1; 267/153
[58] Field of Search ............. 267/140.1, 140.4, 140.5, 267/141.1, 141, 141.2–141.7, 152, 153, 63 R, 63 A, 8, 140.3, 140.2, 35, 292–294, 195, 201–203, 219–220; 248/634, 636, 638, 632

[56] References Cited

U.S. PATENT DOCUMENTS 3,270,998  9/1966  Keetch ..................... 267/141 X
3,831,923  8/1974  Meldrum ..................... 267/141
4,198,037  4/1980  Anderson ..................... 267/153
4,690,388  9/1987  Harrison ................. 267/141.1 X

FOREIGN PATENT DOCUMENTS 0971498  9/1964  United Kingdom ............... 267/153
1586068  3/1981  United Kingdom .

Primary Examiner—Douglas C. Butler
Attorney, Agent, or Firm—Stevens, Davis, Miller & Mosher

[57] ABSTRACT

A spring suitable for use in a vehicle suspension comprises a pair of rigid end members and bonded therebetween a body of elastomeric material which is of solid cross-section over a part of the spring in the vicinity of a first end member and hollow in the vicinity of a second end member for between 10 and 80% of the length of the body. The body is of progressively increasing external cross-sectional dimension over a first part of the length of the body as considered in a direction away from the first end member and of progressively decreasing external cross-section over a second part of the length of the spring extending to the second end member.

19 Claims, 2 Drawing Sheets

HOLLOW ELASTOMERIC SPRING

This application is a continuation-in-part of my U.S. patent application Ser. No. 713,709 filed Mar. 19, 1985 and now abandoned.

This invention relates to a spring and in particular, though not exclusively, to an elastomeric spring of a kind which is intended normally to withstand compression load in a first direction between two opposed end regions of the spring while permitting a degree of substantially free relative movement between said end regions of the spring in a plane which is generally transverse relative to said first direction.

In accordance with the present invention a spring comprises:

first and second rigid end members arranged spaced apart and one opposed relative to the other, a body of elastomeric material which extends between and is bonded to said opposed rigid end members whereby compression forces acting in a first direction on said rigid end members are resisted by compression of the elastomeric body, the maximum external dimension of the bonded area between the first rigid member and body being less than that of the bonded area between the second rigid member and body, the body of elastomeric material being of a substantially symmetrical shape as considered in any cross-section about a major axis of the spring extending in said first direction, the body of elastomeric material being substantially solid in the vicinity of the first of said rigid end members and of a substantially hollow tubular shape in the vicinity of the second of said rigid end members over between 10 and 80% of the length of the body between said opposed rigid end members, said body of elastomeric material in the absence of applied force in the first direction being of progressively increasing external cross-sectional dimension over a first part of the length of the body extending from the first rigid end member and of progressively decreasing external cross-sectional dimension over a second part of the length of the body extending to said second rigid end member, and said second part extending over at least 10% of the length of the body and said first and second parts each being of a curved convex external profile as considered in a plane containing said major axis, the curved external profile of the first part of the length of the spring having at least one centre of curvature and said at least one centre of curvature lying further from the first rigid member in a direction towards the second rigid member than that transverse plane at which the external dimension of the body is a maximum.

Preferably said first part of progressively increasing diameter occupies at least 50% and more preferably at least 60% of the length of the body from the first to the second of said opposed rigid end members as considered in said first direction, being that of the major axis of the spring.

Preferably the body of elastomeric material is substantially hollow over at least 40%, and more preferably between 50 to 70% of the length of the spring as considered in said first direction.

Preferably the maximum external dimension of the spring as considered in a cross-sectional plane perpendicular to the major axis is at a position where the cross-section of the body is annular, i.e. at a hollow portion.

Preferably, as considered in a plane containing the major axis of the body, the external profile of the body over both the first and the second parts is of a convex shape.

The or each centre of curvature of the curved external profile of the second part of the length of the spring preferably lies nearer to the first rigid member than any centre of curvature of the curved external profile of the first part of the length of the spring.

It is further preferred that the or each centre of curvature of the curved external profile of the second part of the length of the spring lies in said transverse plane at which the external dimension of the body is a maximum.

The body of elastomeric material as considered in a cross-sectional plane perpendicular to the major axis preferably is of a generally circular external profile, and also of generally circular internal profile where hollow thereby to result in a spring having substantially uniform load-deflection properties in all transverse directions perpendicular to the major axis. Where, however, non-uniform properties are sought either or both of said internal and external profiles may be non-circular, an elliptical profile being considered particularly useful for many applications.

One or each of the end members may be comprised by a rigid plate, e.g. a metal plate, to which the body of elastomeric material is bonded.

Two or more of said bodies of elastomeric material may be arranged in series with one another. A single rigid member may be provided between and bonded to the end faces of two successive bodies of elastomeric material or each of two confronting end regions may comprise a rigid member, means being provided for securing together said two rigid members.

When two bodies are arranged in series, preferably they are arranged with their solid end regions in proximity and with the hollow portions lying outwards of the pair.

It is further preferred that the elastomeric material is of a low hardness not exceeding 60 Shore A, and preferably in the range 45 to 60 Shore A.

Preferably the hollow portion of the body of elastomeric material defines at least in part a cavity which is at ambient pressure notwithstanding deflection of the spring. Thus when the second of the rigid end members comprises a rigid plate it is preferred that said plate be formed with an opening which is in communication with the cavity thereby to permit the flow of air or other ambient medium to or from the cavity.

Preferably at least when in situ in a suspension the body of elastomeric material is arranged such that when undergoing compression in said first direction the external surface of the body over that part, the second part, which is of progressively decreasing external dimension progressively comes into contact with and is supported by a rigid support member. Said rigid support member may be comprised by an outer region of an end plate bonded to the body of elastomeric material or may be independent of said plate.

Two embodiments of the present invention will now be described, by way of example, with reference to the accompanying diagrammatic drawings wherein.

Figure 1:
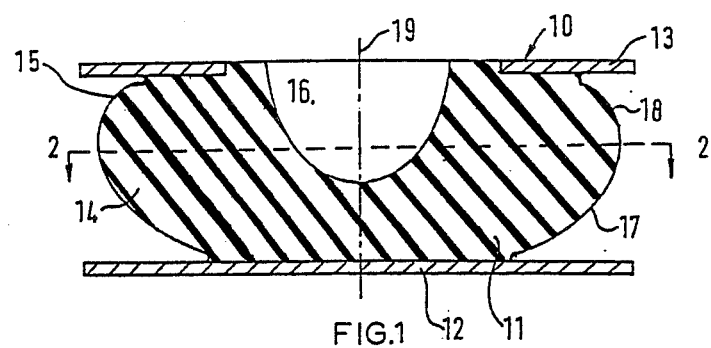
FIG. 1 is a sectional view of a spring in accordance with the present invention in an unloaded condition.

A spring 10 comprises a body 11 of elastomeric material of generally circular cross-sectional shape and located between and bonded to metal end plates 12,13. The elastomeric material has a hardness of 55 Shore A.

The body 11 comprises a first part 14 having a progressively increasing diameter and external surface 17 of convex profile, as considered in a direction away from a first of the end plates, plate 12, and over the remaining second part 15 the body has a progressively decreasing diameter and an external surface 18 also of convex profile. The body 11 is symmetrical about the major axis 19 which lies parallel with the normal direction of compression loading of the spring.

The external surface 17 in the cross-section of FIG. 1 comprises three part-circular portions the respective centres of curvature C1, C2 and C3 of which all lie further from the plate 12 than the transverse plane 2—2 at which the diameter of the body 11 is at a maximum. The external surface 18 has a single centre of curvature C4 which lies on said transvese plane 2—2.

Figure 2:
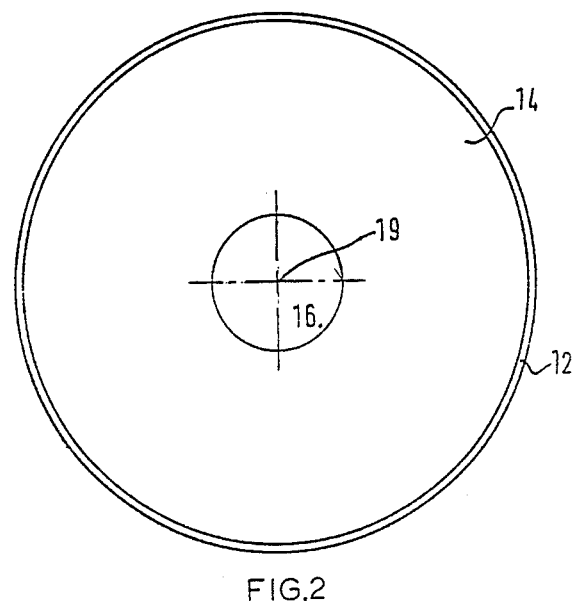
FIG. 2 is a cross-sectional view on the line 2—2 of FIG. 1.

The second part 15 and a part of the first part 14 of the body are annular in cross-section as shown in FIG. 2 and define within the body a cavity 16. The cavity is of a U-shape as viewed in cross-section in the plane of FIG. 1 and extends from the second plate 13 for approximately 60% of the distance by which the two plates are spaced.

The cross-sectional view of FIG. 2 is taken in a transverse plane between the first and second parts 14,15, i.e. at a plane of maximum external diameter. Said plane lies at a distance from the first plate approximately 70% of the distance by which the two plates are separated.

The first plate 12 is in the form of a disc but the second plate 13 is annular thereby to permit a free flow of air to and from the cavity 16.

The two end plates are of a substantially similar external diameter which corresponds approximately with the maximum external diameter of the body 11. Under most load conditions end plates of this size will be sufficient to ensure that when the body 11 is subject to compression the plates 12,13 will provide support for the external surfaces 17,18 of the respective parts 14,15 of the elastomeric body.

Figure 3:
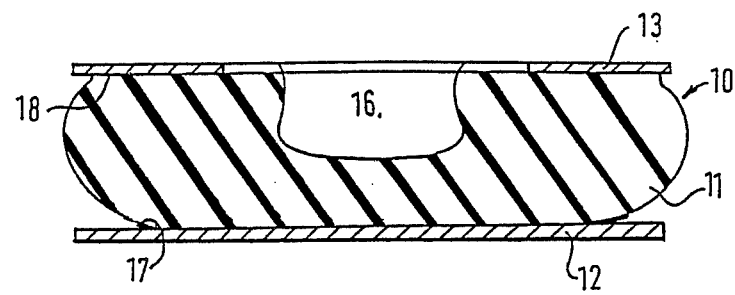
FIG. 3 is a view similar to that of FIG. 1 showing the spring under compression.

FIG. 3 shows the spring of FIG. 1 when under compression and with the end plates providing support for respective parts of the external surfaces 17,18 of the elastomeric body.

Figure 4:
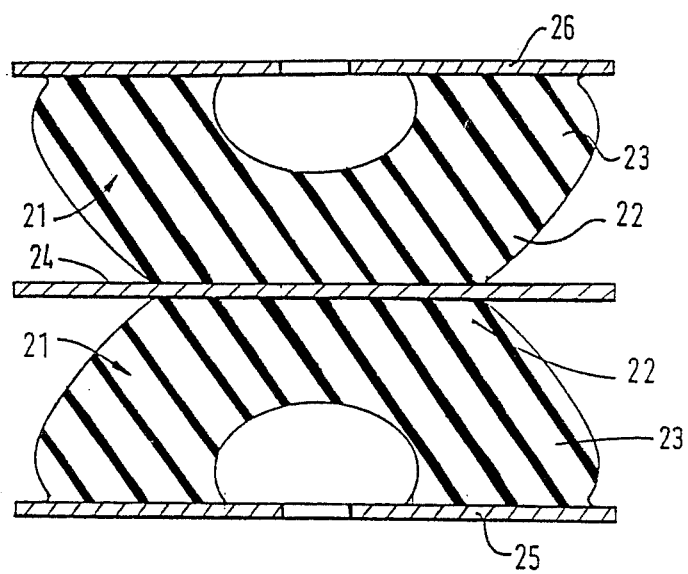
FIG. 4 is a sectional view of a spring in accordance with a second embodiment of the present invention.

In a second embodiment of the invention, illustrated with reference to FIG. 4, a spring comprises a back-to-back arrangement of two elastomeric bodies each constructed substantially as described in respect of the elastomeric body 11 of the first embodiment of the invention.

The two elastomeric bodies 21 are arranged with their solid portions 22 in proximity and with their hollow portions 23 facing outwards.

The solid portions 22 of the two bodies are bonded to opposite surfaces of a metal plate 24 and the assembly of the plate 24 and two bodies 21 is bonded between a pair of metal end plates 25,26 each of a construction similar to the second plate 13 described in respect of the first embodiment of the invention, that is of a diameter corresponding approximately to the maximum external diameter of the bodies 21. Plate 24 has an outer diameter substantially the same as that of plates 25,26.

A spring in accordance with the present invention contrasts distinctly with conventional springs, of the kind commonly known as hour-glass springs, and such as are described in the specification of assignee's U K Patent No. 1586068, in that over part of the length of the spring, as considered in the direction of compression, the external dimension progressively increases, while said dimension progressively decreases over the remainder of the length. The provision of a part of progressively decreasing dimension and specified curved shape is found to give a surprisingly great ability for the spring to accommodate relative transverse movement as compared with a conventional spring of similar compression loading capability. Conversely, as compared with a conventional spring having a similar capability for transverse flexibility, a spring in accordance with the present invention is able to withstand a greater compression loading.

Springs in accordance with the present invention are particularly suitable for use in vehicle suspensions such as, for example, a vehicle suspension of the kind the subject of applicant's co-pending U.S. patent application Ser. No. 713,639 now U.S. Pat. No. 4,690,388 issued Sept. 1, 1987 as a result of continuation application Ser. No. 931,882.

A spring substantially of the kind described herein is described in the specification of said application as being suitable for use within the chamber of an air spring for the purpose of providing support in the event of partial or complete depressurization of the air chamber. A spring in accordance with the present invention additionally may be employed external of the air spring, in series therewith to withstand the compression load to which the vehicle suspension is subject during normal usage.

Having now described my invention—what I claim is:

1. A spring comprising:

first and second rigid end members arranged spaced apart and one opposed relative to the other, a body of elastomeric material which extends between and is bonded to said opposed rigid end members whereby compression forces acting in a first direction on said rigid end members are resisted by compression of the elastomeric body, the maximum external dimension of the bonded area between the first rigid member and body being less than that of the bonded area between the second rigid member and body, the body of elastomeric material being of a substantially symmetrical shape as considered in any cross-section about a major axis of the spring extending in said first direction and said elastomeric material being of a low hardness not exceeding 60 Shore A, the body of elastomeric material being substantially solid in the vicinity of the first of said rigid end members and of a substantially hollow tubular shape in the vicinity of the second of said rigid end members over between 10 and 80% of the length of the body between said opposed rigid end members, said body of elastomeric material in the absence of applied force in the first direction being of progressively increasing external cross-sectional dimension over a first part of the length of the body extending from the first rigid end member and of progressively decreasing external cross-sectional dimension over a second part of the length of the body extending to said second rigid end member, said second part extending over at least 10% of the length of the body and said first and second parts each being of a curved convex external profile as considered in a plane containing said major axis, the curved external profile of the first part of the length of the spring having at least one centre of curvature and said at least one centre of curvature lying further from the first rigid member in a direction towards the second rigid member than that transverse plane at which the external dimension of the body is a maximum, any centre of curvature of the curved external profile of the second part of the length of the spring lying nearer to the first rigid member than any centre of curvature of the curved external profile of the first part of the length of the spring, and said body of elastomeric material being of a substantially hollow tubular shape at said transverse plane at which the external dimension of the body is a maximum.

2. A spring according to claim 1 wherein said first part of progressively increasing diameter occupies at least 50% of the length of the body between opposed rigid end members as considered in said first direction of the spring.

3. A spring according to claim 2 wherein said first part of progressively increasing diameter occupies between 60 and 90% of the length of the body.

4. A spring according to claim 1 wherein the body of elastomeric material is substantially hollow over at least 40% of the length of the body.

5. A spring according to claim 4 wherein the body is substantially hollow over between 50 and 70% of the length of the body.

6. A spring according to claim 1 wherein at least one rigid end member of the spring is comprised by a rigid plate.

7. A spring according to claim 1 wherein a rigid support member is provided for contact by an external surface of the body of elastomeric material when subject to compression.

8. A spring according to claim 7 wherein said rigid support member is comprised by an outer region of the rigid end member.

9. A spring according to claim 1 wherein the hollow portion defines at least in part a cavity which is vented to ambient pressure.

10. A spring according to claim 1 wherein the curved external profile of the second part of the length of the spring has at least one centre of curvature which lies in said transverse plane.

11. A spring comprising:
first and second rigid end members arranged spaced apart and one opposed relative to the other,
a body of elastomeric material which extends between and is bonded to said opposed rigid end members whereby compression forces acting in a first direction on said rigid end members are resisted by compression of the elastomeric body, the maximum external dimension of the bonded area between the first rigid member and body being less than that of the bonded area between the second rigid member and body,
the body of elastomeric material being of a substantially symmetrical shape as considered in any cross-section about a major axis of the spring extending in said first direction, the body of elastomeric material being substantially solid in the vicinity of the first of said rigid end members and of a substantially hollow tubular shape in the vicinity of the second of said rigid end members over between 10 and 80% of the length of the body between said opposed rigid end members, said body of elastomeric material in the absence of applied force in the first direction being of progressively increasing external cross-sectional dimension over a first part of the length of the body extending from the first rigid end member and of progressively decreasing external cross-sectional dimension over a second part of the length of the body extending to said second rigid end member, said second part extending over at least 10% of the length of the body and said first and second parts each being of a curved convex external profile as considered in a plane containing said major axis, the curved external profile of the first part of the length of the spring having at least one centre of curvature and said at least one centre of curvature lying further from the first rigid member in a direction towards the second rigid member than that transverse plane at which the external dimension of the body is a maximum, and any centre of curvature of the curved external profile of the second part of the length of the spring lying nearer to the first rigid member than any centre of curvature of the curved external profile of the first part of the length of the spring.

12. A spring according to claim 11 wherein said elastomeric material is of a low harness not exceeding 60 Shore A.

13. A spring according to claim 12 wherein said hardness is in the range 45 to 60 Shore A.

14. A spring according to claim 11 wherein said body of elastomeric material is of a substantially hollow tubular shape at said transverse plane at which the external dimension of the body is a maximum.

15. A spring according to claim 11 wherein said first part of progressively increasing diameter occupies at least 50% of the length of the body between opposed rigid end members as considered in said first direction of the spring.

16. A spring according to claim 15 wherein said first part of progressively increasing diameter occupies between 60 and 90% of the length of the body.

17. A spring according to claim 11 wherein the body of elastomeric material is substantially hollow over at least 40% of the length of the body.

18. A spring according to claim 17 wherein the body is substantially hollow over between 50 and 70% of the length of the body.

19. A spring comprising:
first and second rigid end members arranged spaced apart and one opposed relative to the other,
a body of elastomeric material which extends between and is bonded to said opposed rigid end members whereby compression forces acting in a first direction on said rigid end members are resisted by compression of the elastomeric body, the maximum external dimension of the bonded area between the first rigid member and body being less than that of the bonded area between the second rigid member and body, the body of elastomeric material being of a substantially symmetrical shape as considered in any cross-section about a major axis of the spring extending in said first direction, the body of elastomeric material being substantially solid in the vicinity of the first of said rigid end members and of a substantially hollow tubular shape in the vicinity of the second of said rigid end members over between 50 and 70% of the length of the body between said opposed rigid end members, said body of elastomeric material in the absence of applied force in the first direction being of progressively increasing external cross-sectional dimension over a first part of the length of the body extending from the first rigid end member and of progressively decreasing external cross-sectional dimension over a second part of the length of the body extending to said second rigid end member, said first part extending over between 60 and 90% of the length of the body and said first and second parts each being of a curved convex external profile as considered in a plane containing said major axis, the curved external profile of the first part of the length of the spring having at least one centre of curvature and said at least one centre of curvature lying further from the first rigid member in a direction towards the second rigid member than that transverse plane at which the external dimension of the body is a maximum, and
any centre of curvature of the curved external profile of the second part of the length of the spring lying nearer to the first rigid member than any centre of curvature of the curved external profile of the first part of the length of the spring.

* * * * *